United States Patent
Chan et al.

(10) Patent No.: US 8,400,797 B2
(45) Date of Patent: Mar. 19, 2013

(54) POWER CONVERSION SYSTEM WITH ZERO-VOLTAGE START-UP MECHANISM, AND ZERO-VOLTAGE START-UP DEVICE

(75) Inventors: Chun-Kong Chan, Taipei County (TW); Hsi-Yuan Tsai, Taipei County (TW)

(73) Assignee: Lien Chang Electronic Enterprise Co., Ltd., Taipei County (TW)

( * ) Notice: Subject to any disclaimer, the term of this patent is extended or adjusted under 35 U.S.C. 154(b) by 286 days.

(21) Appl. No.: 12/842,297

(22) Filed: Jul. 23, 2010

(65) Prior Publication Data
US 2012/0020132 A1    Jan. 26, 2012

(51) Int. Cl.
*H02M 7/10* (2006.01)
*H02M 7/00* (2006.01)

(52) U.S. Cl. ............... 363/86; 363/49; 363/50; 363/52; 363/84; 363/85; 363/87; 363/89; 363/125; 363/126; 323/901

(58) Field of Classification Search ............ 363/49, 363/50, 52, 84, 85, 86, 87, 89, 125, 126; 323/901
See application file for complete search history.

(56) References Cited

U.S. PATENT DOCUMENTS

| | | | | |
|---|---|---|---|---|
| 4,581,542 | A * | 4/1986 | Steigerwald | 327/440 |
| 5,418,703 | A * | 5/1995 | Hitchcock et al. | 363/17 |
| 5,654,661 | A * | 8/1997 | Kammiller | 327/438 |
| 5,850,160 | A * | 12/1998 | Schnetzka et al. | 327/438 |
| 6,483,724 | B1 * | 11/2002 | Blair et al. | 363/17 |
| 6,671,192 | B2 * | 12/2003 | Maeda et al. | 363/44 |
| 7,136,294 | B2 * | 11/2006 | Phadke et al. | 363/132 |
| 8,035,996 | B1 * | 10/2011 | Greenfeld | 363/17 |
| 2003/0165070 | A1* | 9/2003 | Maeda et al. | 363/84 |
| 2011/0193494 | A1* | 8/2011 | Gaknoki et al. | 315/297 |
| 2011/0194312 | A1* | 8/2011 | Gaknoki et al. | 363/21.12 |

* cited by examiner

*Primary Examiner* — Bao Q Vu
(74) *Attorney, Agent, or Firm* — Rosenberg, Klein & Lee

(57) ABSTRACT

A power conversion system with zero-voltage start-up mechanism and a zero-voltage start-up device are disclosed. The system includes a power conversion circuit, a power factor correction unit, a storage capacitor, a storage switching unit, and a zero-voltage detection module. The storage switching unit is serially connected with the storage capacitor, and particularly controlled by the zero-voltage detection module. The zero-voltage detection module detects a timing as an input voltage is at low level, and then outputs a control signal to turn on the storage switching unit. Therefore, the present invention assures that the power conversion system is turned on when the input voltage is at the low level, in order to suppress the system from a surge current.

10 Claims, 3 Drawing Sheets

POWER CONVERSION SYSTEM WITH ZERO-VOLTAGE START-UP MECHANISM, AND ZERO-VOLTAGE START-UP DEVICE

BACKGROUND OF THE INVENTION

1. Field of the Invention

The present invention relates to a power conversion system, in particular, to the power conversion system introducing a zero-voltage switching mechanism to suppress the system from a surge current, and further to a zero-voltage start-up device.

2. Description of Related Art

For suppressing the surge current as starting up a power conversion system, and enhancing stability of power supply circuit as starting, the conventional power conversion system is provided. Such as the system shown in FIG. 1, the system includes an electromagnetic interference suppression unit 101, a standby circuit 105, a power conversion circuit 107, and a bridge rectifier 119. The electromagnetic interference suppression unit 101 is used to suppress the whole circuit from the EM interference caused by the input power supply Vin. A power factor correction unit 103 and a small capacitor 109 may be included to correct the power factor and adapted to the circuit with large load.

When the power conversion system plugs to the input power supply Vin and a switching unit 115 is not yet turned on. That means the electronic device at the back end load does not function. Meanwhile, the input power charges the storage capacitor 111 via a diode D, and the device stays in standby and provides standby power to the back end load. Therefore, the load may operate as standby state.

When a user starts up the back end load, the switching unit 115 is turned on firstly. Meanwhile, an input power Vin is supplied to the power factor correction unit 103, the storage capacitor 111, and the power conversion circuit 107 via the switching unit 115 and a surge suppression unit 117, a bridge rectifier 119 and a small capacitor 109. This conventional scheme adopts the surge suppression unit 117 to prevent the whole power conversion system from the damage caused by a large current from the input power Vin.

Next, when the current is getting stable, the switching unit 115 connected to the surge suppression unit 117 is turned on, and the input power Vin is routed through the path of the switching unit 115 in order to supply power to the circuits in the power conversion system. The surge suppression unit 117 will not continuously consume the power as it shorts the circuit after the input power current is stable. Therefore, the scheme may save the power consumption.

However, the conventional scheme needs the switching unit 115 to turn on or turn off the circuit for suppressing the surge current. Thus an additional device is required to drive the switching unit 115, and the driver (not shown) will increase the cost.

SUMMARY OF THE INVENTION

In view of the conventional drawback, the present invention provides a solution, provided is a power conversion system with a zero-voltage start-up mechanism. It is an object to detect a zero-voltage of an input AC power, and the power conversion system starts to operate as reaching the zero-voltage. Thus the system can avoid damage from the surge current. It also simplifies the circuit structure and reduces the cost.

The power conversion system with the zero-voltage start-up mechanism is particularly provided. The power conversion system, in one embodiment, includes a power conversion circuit, a bridge rectifier, a storage capacitor, a storage switching unit, and a zero-voltage detection module. Further, the power conversion system in a high-load application may also includes power factor correction unit, which may be coupled to the midst of the mentioned power conversion circuit, the bridge rectifier, and a small capacitor, used to correct the power factor. The power conversion circuit is used to convert an input voltage received from a power supply, and to supply an output voltage to a back end load. The storage capacitor, coupled to the power conversion circuit, is used to store power for supplying to the load.

The storage switching unit is connected to the storage capacitor in series. The storage switching unit may control if the capacitor is charged by turning on or off the switch. The zero-voltage detection module is coupled to the storage switching unit in order to retrieve a detection signal from an AC power. A control signal is accordingly generated to control the storage switching unit to be turned on. In which, the control signal is generated to turn on the storage switching unit when the zero-voltage detection module detects the detection signal showing the input voltage of the power supply is zero. The storage capacitor is then charged.

The zero-voltage detection module further includes a rectification unit, a first switching unit, a second switching unit, and a voltage-division unit. The rectification unit is coupled to the AC power for rectifying its input voltage. Then the detection signal is generated. The first switching unit is coupled to the rectification unit for receiving the input voltage rectified by the rectification unit, and accordingly turning on or off the switch. The second switching unit is coupled to the first switching unit. When the first switching unit is turned on, the second switching unit will receive an auxiliary control signal, and be turned on. The voltage-division unit is coupled to the rectification unit and the first switching unit for dividing the rectified input voltage, and then sent to the first switching unit.

Further, the power conversion system may include a protection unit and a standby circuit. This protection unit is particularly coupled to the power factor correction unit. The protection unit is simply a fuse or an electromagnetic interference suppression unit. The standby circuit is coupled to the storage capacitor.

A further aspect of the present invention provides a zero-voltage start-up device of the power conversion system. The related power conversion system substantially has a power conversion circuit, a bridge rectifier, and a storage capacitor. This power conversion circuit receives an input voltage from a power supply, and generates an output voltage to supply to a load. The zero-voltage start-up device includes a storage switching unit and a zero-voltage detection module.

The storage switching unit is connected to the storage capacitor in series, and the zero-voltage detection module is coupled to the storage switching unit for retrieving a detection from the power supply and accordingly generating a control signal for turning on the storage switching unit. In particular, the zero-voltage detection module generates the control signal to turn on the storage switching unit when the detection signal shows the input voltage is zero.

The zero-voltage detection module includes a rectification unit, a first switching unit, and a second switching unit. The rectification unit is coupled to the power supply for rectifying the input voltage of the power supply and accordingly generating the detection signal. The first switching unit is then coupled to the rectification unit for receiving the input voltage rectified by the rectification unit. According to the rectified input voltage, it is to switch the switching unit to be turned on or turned off. The second switching unit is coupled to the first switching unit. When the first switching unit is turned on, the second switching unit receives an auxiliary control signal, and is turned on. Furthermore, the zero-voltage detection module also includes a voltage-division unit, and is coupled to the rectification unit and the first switching unit. Therefore, the rectification unit rectifies the input voltage and performs division of voltage. After that, the input voltage is sent to the first switching unit.

Through the zero-voltage detection module, a zero voltage of the input voltage can be detected. The power conversion system may be activated at the zero voltage in order to suppress the surge current caused by an unexpected high input voltage. Therefore, the related circuit can be more stable. Further the conventionally extra surge suppression unit and the driver for controlling the switching unit may not be used for reducing the cost.

These and other various advantages and features of the present invention will become apparent from the following description and claims, in conjunction with the appended drawings.

DESCRIPTION OF THE PREFERRED EMBODIMENTS

Figure 1:
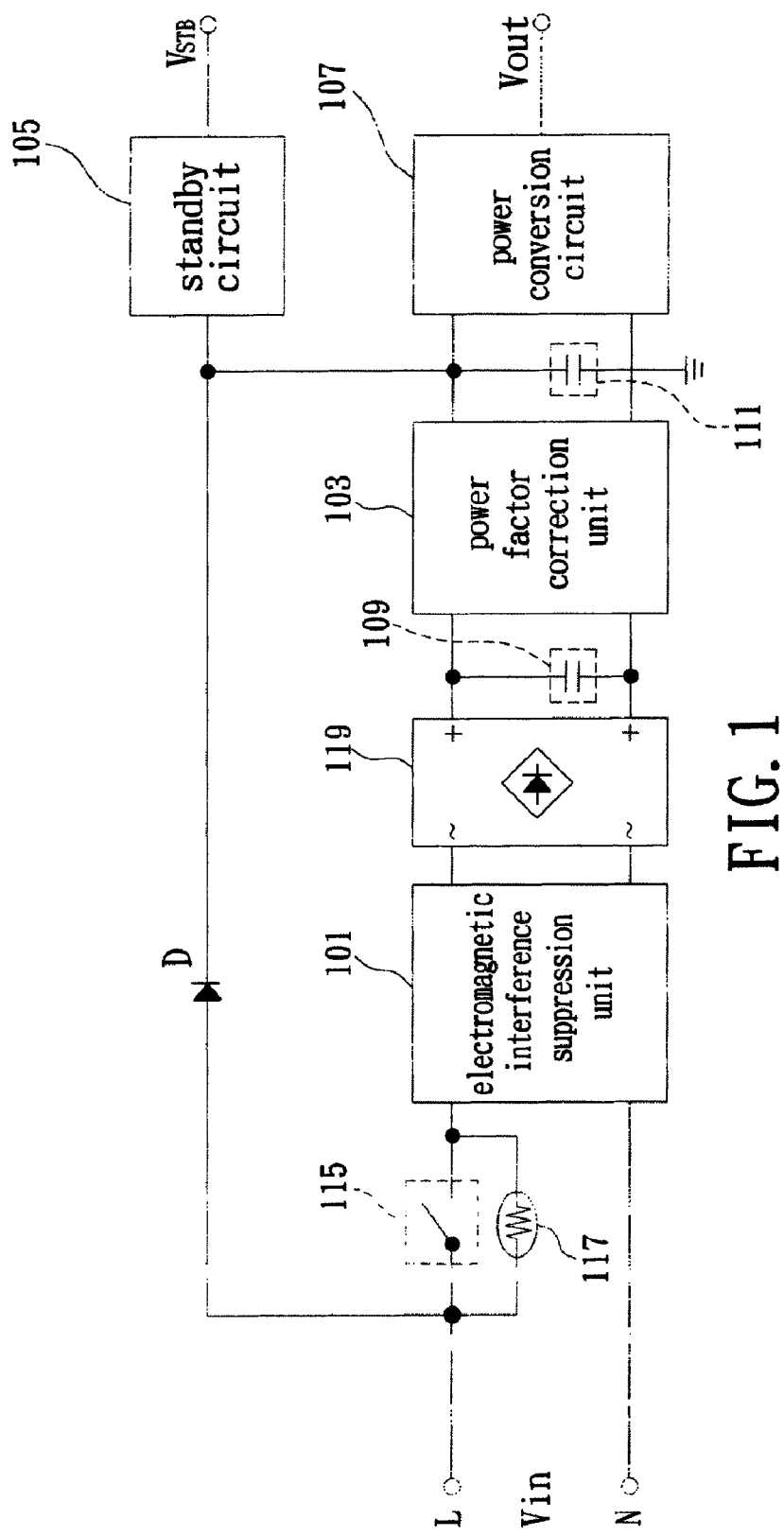
FIG. 1 shows a block diagram of a conventional power conversion system.
Figure 2:
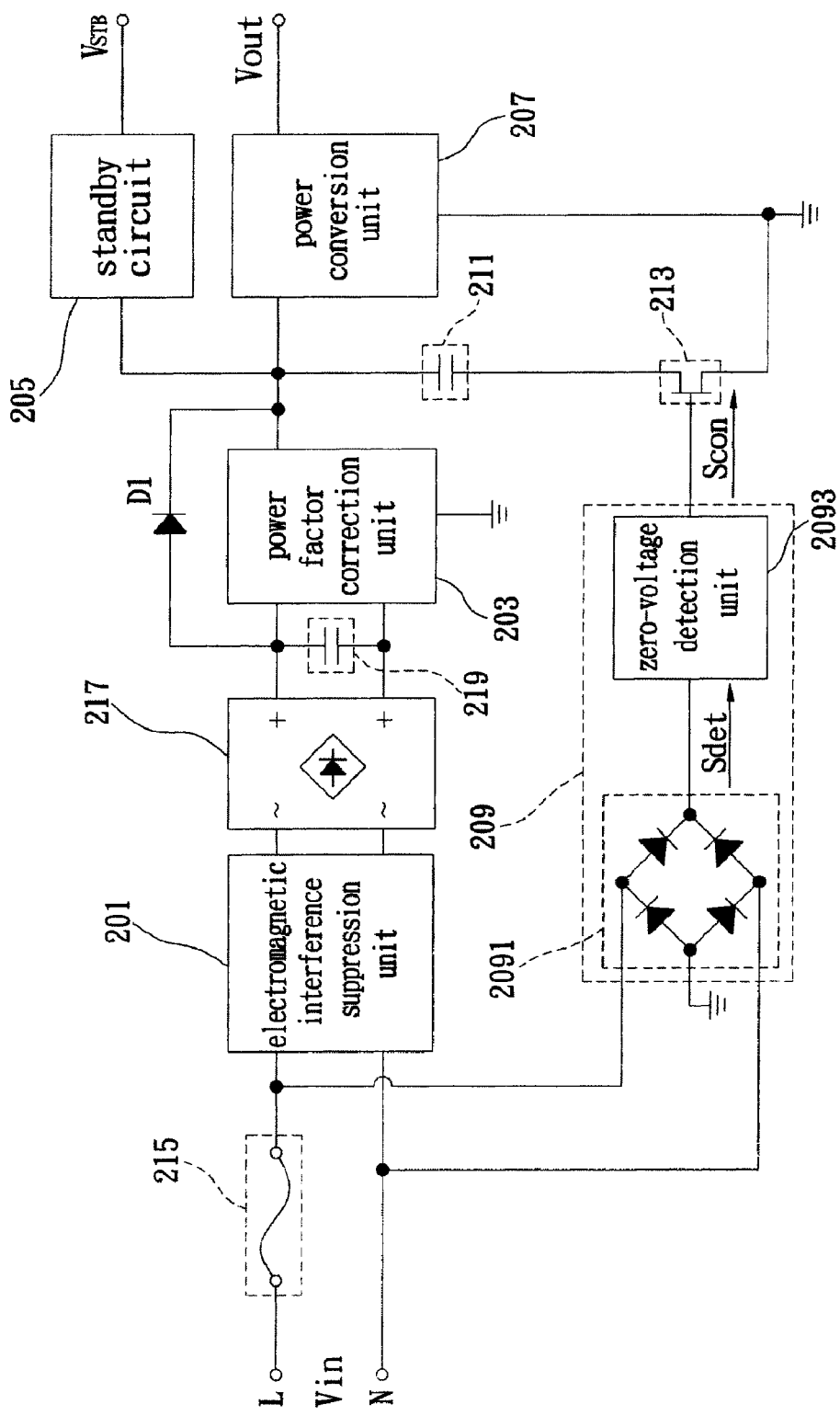
FIG. 2 shows a block diagram of one embodiment of the power conversion system with zero-voltage start-up mechanism in according with the present invention.

In FIG. 2, the power conversion system having a zero-voltage start-up mechanism includes a power conversion circuit 207, a zero-voltage detection module 209, a storage capacitor 211, a storage switching unit 213, and a bridge rectifier 217. In an application with higher load, the power conversion system may further include a power factor correction unit 203 and a small capacitor 219. In particular, the storage switching unit 213 and the zero-voltage detection module 209 are namely the zero-voltage start-up device in accordance with the present invention.

When the power conversion system connects to a power supply and receives an input voltage Vin, the system is to charge a small capacitor 219. Next, the system continuously charges a power factor correction unit 203 and the storage capacitor 211. The charged power supplies to the power conversion circuit 207. In general, the power supply is an AC power, and its voltage and current tend to higher. The mentioned input voltage Vin, for example a sine wave, has the highest points at both a positive amplitude and a negative amplitude, which are respectively at the 90-degree phase and 270-degree phase. That means the 0-degree or 360-degree phase, and the 180-degree phase are the zero-voltage points.

At the moment as the power conversion system connects to the input voltage Vin, the phase angle of the input voltage Vin may be any angle around 0 degree through 360 degrees. The system may not control the instant input is at high voltage or low voltage. The system may meet a surge current as the instant input is at high voltage. Therefore, the system requires a surge suppression mechanism for preventing the system circuit from any damage caused by the surge current.

In order to maintain a stable circuit, the present invention incorporates the zero-voltage detection module 209 and the storage switching unit 213 as a mechanism to suppress the surge current. The storage switching unit 213 is serially connected to the storage capacitor 211. The zero-voltage detection module 209 is coupled to both the input AC voltage Vin and the storage switching unit 213 for retrieving the input voltage Vin. The module 209 then converts the input voltage Vin into a detection signal Sdet and generates a control signal Scon for controlling the storage switching unit 213.

The zero-voltage detection module 209 may include a rectification unit 2091 and a zero-voltage detection unit 2093. The rectification unit 2091 receives the input voltage Vin, which is then performed by rectification. The detection signal Sdet is then generated. The zero-voltage detection unit 2093, in the embodiment, may determine if the input AC voltage Vin is at zero-voltage level. If the control signal Scon is instantly generated, the storage switching unit 213 is turned on.

On the words, the input voltage Vin does not charge the storage capacitor 211 via the route over the bridge rectifier 217 and the diode D1D because the storage switching unit 213 is still at turn-off state at the moment of the power conversion system plugging into the power supply. On the contrary, at that moment, through the determination made by the zero-voltage detection module 209, the input voltage Vin starts to charge the capacitor 211 when the input voltage Vin is affirmed at zero voltage, such as the sine wave at 0-degree, 180-degree, and 360-degree phase angles, and to turn on the storage switching unit 213. Thus, the storage capacitor 211 and the power conversion unit 207 are affirmed to receive power at low level. Therefore, the surge current can be prevented from the circuit damage since the power conversion system starts up as the input voltage Vin is zero voltage.

Further reference is made to FIG. 2. The power conversion system further includes a protection unit and a standby circuit 205. The protection unit may use a fuse 215 and an electromagnetic interference suppression unit 201 to protect the power conversion system.

After the storage capacitor 211 is charged, and the load (not shown) of the power conversion unit 207 is not yet activated by a user, an output voltage $V_{STB}$ can be supplied by the standby circuit 205 to the load. The load may be operated at a standby mode.

After the load is activated, the power factor correction unit 203 can be activated to perform a boosting conversion, and supply output voltage Vout to the load via the power conversion unit 207. The power conversion system can be normally operated.

Figure 3:
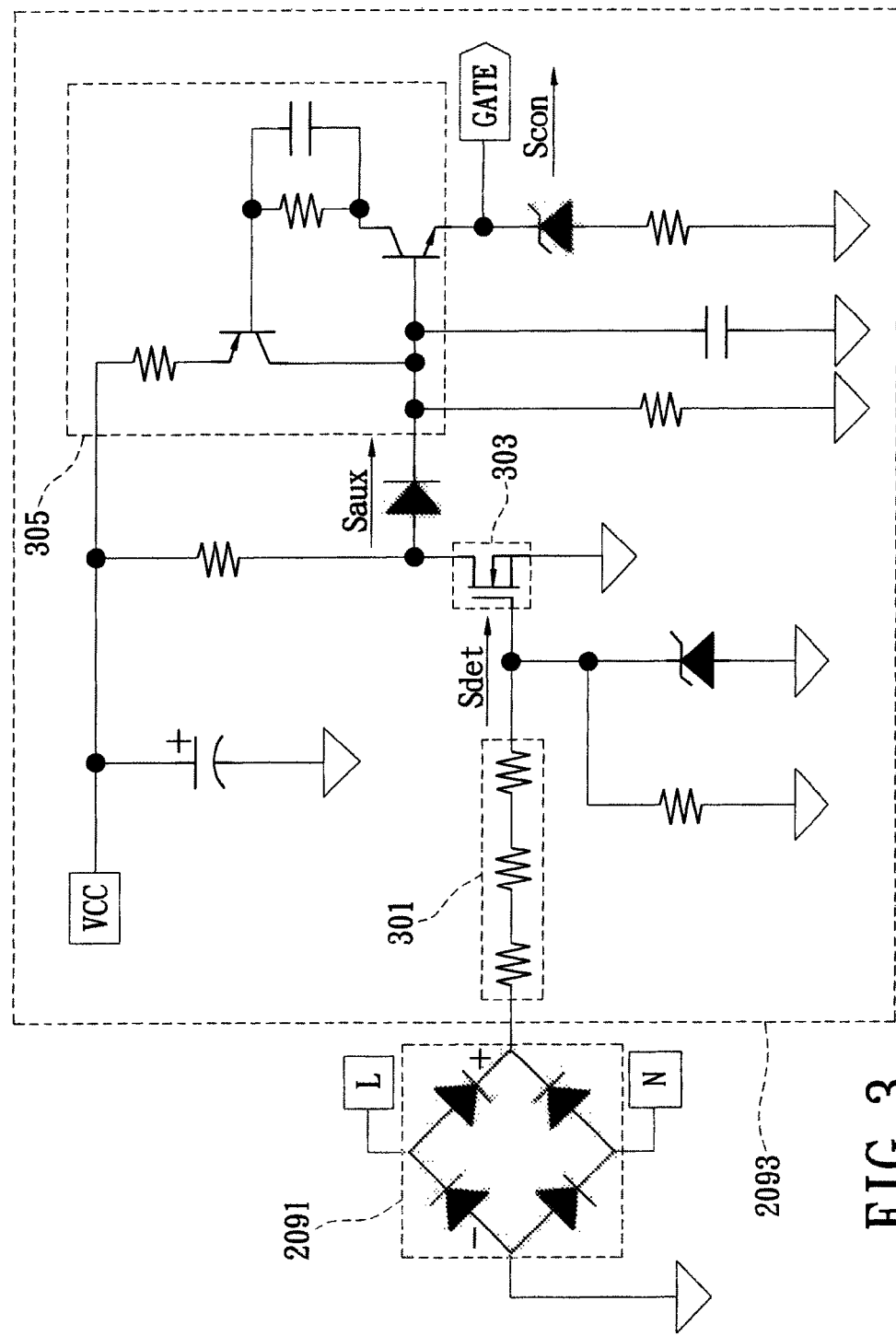
FIG. 3 schematically shows a circuit diagram of the zero-voltage detection module in accordance with the present invention.

Reference is made to FIG. 3 illustrating a circuit diagram of one embodiment of the zero-voltage detection module 209 in accordance with the present invention. The module 209 has a rectification unit 2091 and a zero-voltage detection unit 2093. The zero-voltage detection unit 2093 has a voltage-division unit 301, a first switching unit 303, and a second switching unit 305. In particular, the second switching unit is a kind of silicon controlled rectifier (SCR), which is featured that the current can flow through an anode and cathode as a gate receives a high voltage. After the route is turned on, the anode and cathode may not be turned off even though the gate electrode becomes a low voltage. Only if the current flowing through the anode and the cathode is smaller than a holding current, then the silicon controlled rectifier is turned off.

In particular, the rectification unit 2091 rectifies the input AC voltage Vin, and performs a voltage division by the voltage-division unit 301. The detection signal Sdet is then generated. The first switching unit 303 coupled to the voltage-division unit 301 is to receive the detection signal Sdet, and accordingly switches between the turn-on state and the turn-off state.

When the received detection signal Sdet, that is the signal indicative of the input voltage Vin under a full-wave rectification and voltage division, is at high level as long as the input voltage Vin, the first switching unit 303 can be turned on. So that, the auxiliary control signal Saux is grounded, and the second switching unit 305 stays turn-off. At the moment, the control signal Scon outputted to the storage switching unit 213 is at low level, and the storage switching unit 213 will not be turned on.

Furthermore, when the detection signal Sdet is at low level, that means the input voltage Vin is also at low, the first switching unit 303 is turned off, the auxiliary control signal Saux is pulled high by VCC. At the moment, the second switching unit 305 is turned on as receiving the high-level auxiliary control signal Saux. Thus, the control signal Scon outputted to the storage switching unit 213 can be pulled high by VCC, and more, the storage switching unit 213 is turned on to start up the power conversion system. The power conversion system, therefore, can be activated at a low level for preventing power conversion system from the surge current damage.

It is worth noting that since the second switching unit 305 is a silicon controlled rectifier (SCR), even the auxiliary control signal Saux is descended to a low level once the unit 305 is turned on, the second switching unit 305 may not be back to turn-off state.

By means of a zero-voltage detection mechanism, the power conversion system needs no any additional driver for the switching unit and the surge suppression unit, and is still capable of preventing the surge current. The invention will not consume any extra electric power even it uses the mentioned driver or the surge suppression unit, therefore, the power conversion system simplifies its design, reduce cost, and raise the efficiency and stability.

While the above description constitutes the preferred embodiment of the present invention, it should be appreciated that the invention may be modified without departing from the proper scope or fair meaning of the accompanying claims. Various other advantages of the present invention will become apparent to those skilled in the art after having the benefit of studying the foregoing text and drawings taken in conjunction with the following claims.

What is claimed is:

1. A power conversion system with zero-voltage start-up mechanism, comprising:
   a power conversion circuit, converting an input voltage received from a power supply, and providing an output voltage to a load;
   a bridge rectifier, coupled to the power conversion circuit, and rectifying the input voltage;
   a storage capacitor, coupled to the power conversion circuit, and storing power for powering the load;
   a storage switching unit, connected with the storage capacitor in series; and
   a zero-voltage detection module, coupled to the storage switching unit, generating a detection signal responsive to the input voltage, and outputting a control signal to control the turn-on operation of the storage switching unit, accordingly;
   wherein the zero-voltage detection module generates the control signal to turn on the storage switching unit and begins to have the rectified input voltage charging the storage capacitor when the detection signal indicates the input voltage of the power supply is at zero voltage level so as to suppress the surge current.

2. The system of claim 1, wherein the zero-voltage detection module comprises:
   a rectification unit, coupled to the power supply, rectifying the input voltage outputted from the power supply, and generating the detection signal according to the rectification of the input voltage.

3. The system of claim 2, wherein the zero-voltage detection module further comprises:
   a first switching unit, coupled to the rectification unit, and configured to receive the input voltage rectified by the rectification unit, and to control a switching state thereof, accordingly.

4. The system of claim 3, wherein the zero-voltage detection module further comprises:
   a second switching unit, coupled to the first switching unit, the second switching unit receiving an auxiliary control signal when the first switching unit is turned on, and switching on accordingly.

5. The system of claim 4, wherein the second switching unit is a silicon controlled rectifier.

6. The system of claim 3, wherein the zero-voltage detection module further comprises:
   a voltage-division unit, coupled to the rectification unit and the first switching unit, used to divide the input voltage rectified by the rectification unit and outputted to the first switching unit, accordingly.

7. The system of claim 1, further comprising:
   a power factor correction unit, coupled to the power conversion circuit, used for boosting conversion and power factor correction.

8. A zero-voltage start-up device of a power conversion system having a power conversion circuit, a bridge rectifier, and a storage capacitor, wherein the power conversion circuit receives an input voltage from a power supply, and generates an output voltage supplying a load, the zero-voltage start-up device comprising:
   a storage switching unit, connected with the storage capacitor in series; and
   a zero-voltage detection module, coupled to the storage switching unit, used for generating a detection signal responsive to the input voltage, and outputting a control signal to control the turn on operation of the storage switching unit, accordingly;
   wherein, the zero-voltage detection module generates the control signal turning on the storage switching unit and begins to have the rectified input voltage charging the storage capacitor when the detection signal indicates the input voltage is at zero voltage level so as to suppress the surge current.

9. The device of claim 8, wherein the zero-voltage detection module further comprises:
   a rectification unit, coupled to the power supply, used for rectifying the input voltage outputted from the power supply, and generating the detection signal according to the rectification of the input voltage;
   a first switching unit, coupled to the rectification unit, configured to receive the input voltage rectified by the rectification unit, and to control a switching state thereof, accordingly; and
   a second switching unit, coupled to the first switching unit, wherein the second switching unit receives an auxiliary control signal when the first switching unit is turned on, and switches on, accordingly.

10. The device of claim 9, wherein the zero-voltage detection module further comprises:
a voltage-division unit, coupled to the rectification unit and the first switching unit, dividing the input voltage rectified by the rectification unit, and outputted to the first switching unit, accordingly.

* * * * *